United States Patent
Syrowik et al.

(10) Patent No.: US 7,306,286 B2
(45) Date of Patent: Dec. 11, 2007

(54) HOLD-OPEN ASSEMBLY FOR A RECLINER SEAT LOCKING MECHANISM

(75) Inventors: Glenn F Syrowik, Ortonville, MI (US); Pius Ng, Markham (CA); Erik Fontaine, Newmarket (CA); Ravi Hosalli, Troy, MI (US); Ronald J Kaip, Sterling Heights, MI (US)

(73) Assignees: Chrysler LLC, Auburn Hills, MI (US); Intier Automotive Inc., Newmarket, Ontario (CA)

( * ) Notice: Subject to any disclaimer, the term of this patent is extended or adjusted under 35 U.S.C. 154(b) by 416 days.

(21) Appl. No.: 11/056,377

(22) Filed: Feb. 10, 2005

(65) Prior Publication Data

US 2006/0175885 A1    Aug. 10, 2006

(51) Int. Cl.
*B60N 2/02* (2006.01)
*B60N 2/48* (2006.01)

(52) U.S. Cl. .................................................. 297/378.12

(58) Field of Classification Search ........... 297/378.12, 297/374, 354.1, 376, 367
See application file for complete search history.

(56) References Cited

U.S. PATENT DOCUMENTS

| | | | | |
|---|---|---|---|---|
| 4,997,223 | A | * | 3/1991 | Croft ........................... 297/367 |
| 5,810,444 | A | * | 9/1998 | Refior et al. ........... 297/378.12 |
| 7,204,556 | B2 | * | 4/2007 | Schwerdtner et al. .. 297/378.12 |

* cited by examiner

*Primary Examiner*—George B. Nguyen
*Assistant Examiner*—Kaitlin A Wilson
(74) *Attorney, Agent, or Firm*—Ralph E. Smith

(57) ABSTRACT

An assembly for holding open a locking mechanism for a motor vehicle folding seat includes a locking mechanism having a gear shaft and a release link fixedly attached to the gear shaft that transitions the locking mechanism between an engaged and a released orientation. A hold-open pin attached to the release link is received within a follower link notch to maintain the locking mechanism in the released orientation. An actuator positions the follower link notch to receive the hold-open pin within the follower link notch.

12 Claims, 3 Drawing Sheets

HOLD-OPEN ASSEMBLY FOR A RECLINER SEAT LOCKING MECHANISM

TECHNICAL FIELD OF THE INVENTION

This invention relates generally to motor vehicle seats and relates more specifically to an assembly for holding a seat locking mechanism in an open position.

BACKGROUND OF THE INVENTION

Many motor vehicles, particularly sport utility vehicles and minivans, are equipped with rear seat assemblies that can be moved from a seating configuration, in which a passenger can sit in the seat, to a so-called "load floor" configuration, in which the seatback of a recliner seat assembly is folded forward to assume a horizontal orientation and thereby facilitate cargo stowage.

Typically, a locking mechanism is provided for holding the seat assembly in the seating configuration, and the locking mechanism can be released to permit moving the seat assembly to the load floor configuration. In seat assemblies where the locking mechanism automatically returns to a locked position when the force applied to the handle used to release the locking mechanism is removed, returning the seat assembly to the seating configuration may require an individual to use one hand to apply a force maintaining the release handle in the unlocked position while the other hand lifts the seatback from the folded position. This is undesirable as it requires the individual to have both hands free for the task and may require the individual to assume an awkward position while returning the seat to the seating configuration.

Therefore, it would be desirable to have an assembly for holding a seat locking mechanism in an open position that overcomes the aforementioned and other disadvantages.

SUMMARY OF THE INVENTION

One aspect of the present invention is an assembly for holding open a locking mechanism for a motor vehicle folding seat. The assembly comprises a locking mechanism having a gear shaft and a release link fixedly attached to the gear shaft. The release link has a first position in which the gear shaft is rotated such that the locking mechanism is engaged and a second position in which the gear shaft is rotated such that the locking mechanism is released. The assembly further comprises a hold-open pin fixedly attached to the release link and a follower link having a notch sized to receive the hold-open pin. An actuator is operably attached to the follower link, the actuator having a first position in which the hold-open pin moves freely across an upper surface of the follower link and a second position in which the hold-open pin is received within the follower link notch. When the actuator is in its second position with the hold-open pin received within the follower link notch, the release link is maintained in its second position with the locking mechanism released.

Another aspect of the present invention is an assembly for holding open a locking mechanism for a motor vehicle folding seat comprising means for engaging and releasing a locking mechanism; means for rotating the engaging and releasing means; and means for maintaining the engaging and releasing means in a configuration such that the locking mechanism is released, the maintaining means including a notch and a pin receivable within the notch.

These and other features and advantages of the invention will become further apparent from the following detailed description of the presently preferred embodiments, read in conjunction with the accompanying drawings. The drawings are not drawn to scale. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
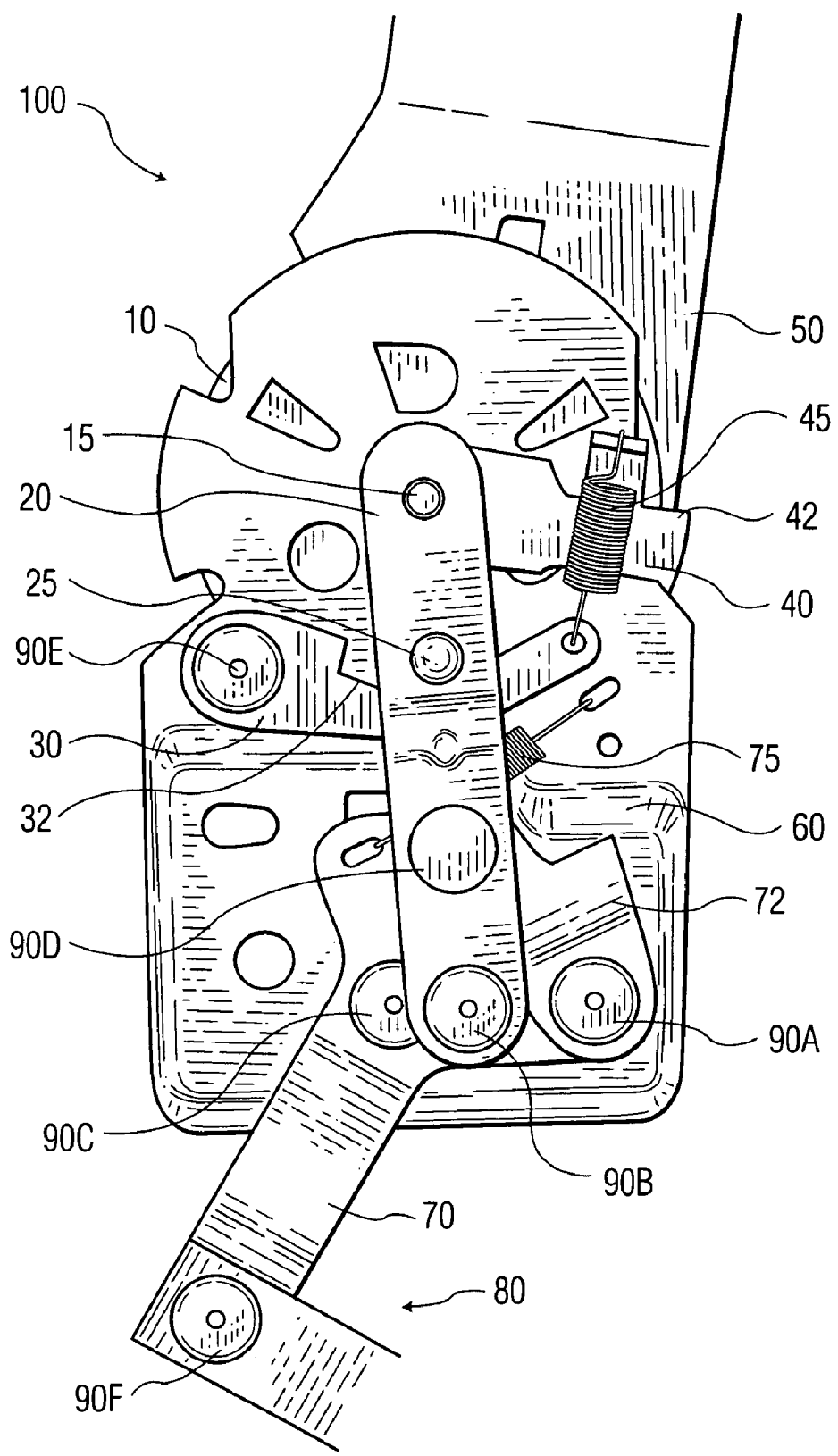
FIG. 1 is a schematic front view of a hold-open assembly according to the present invention.
Figure 2:
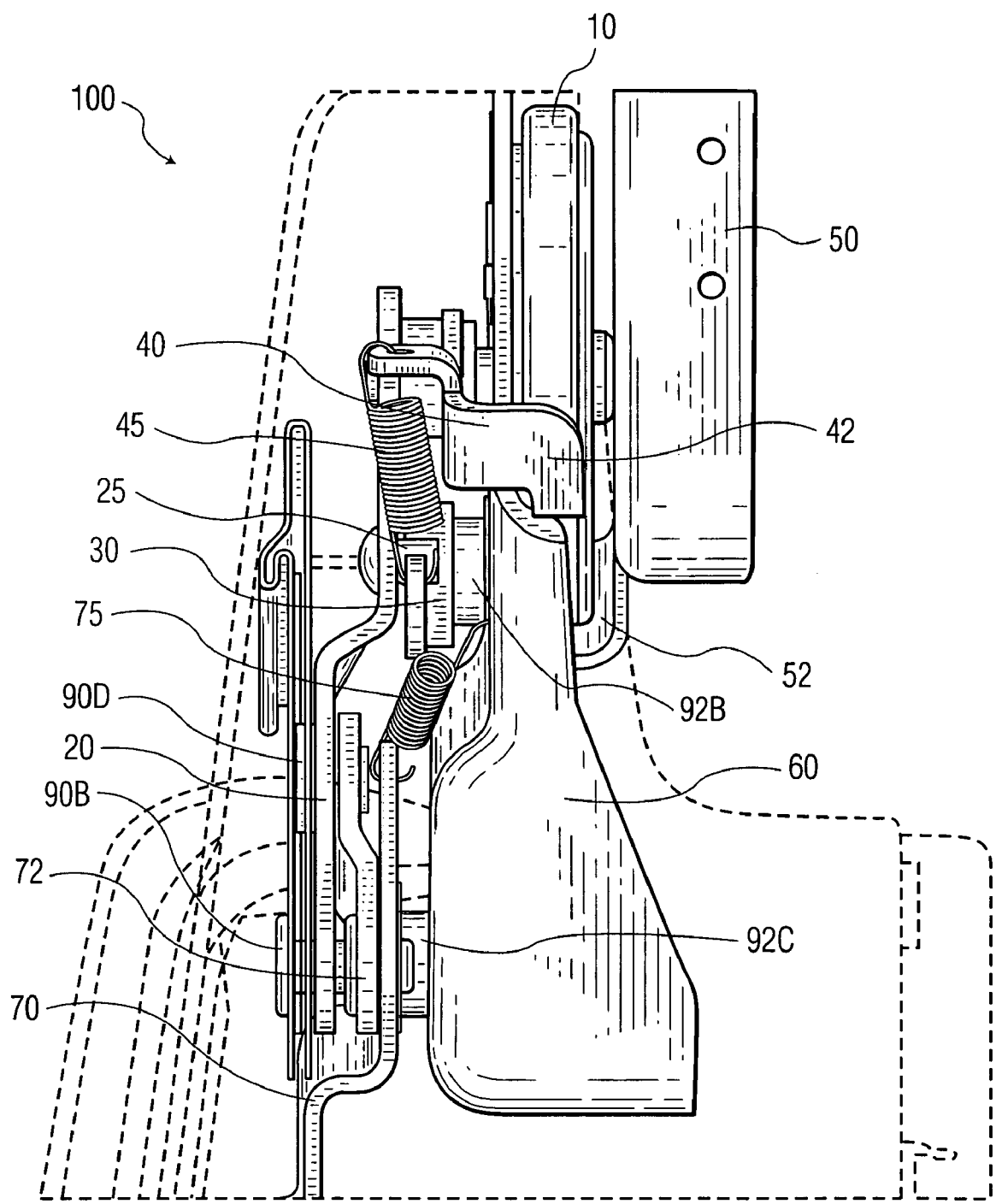
FIG. 2 is a schematic side view of the hold-open assembly of FIG. 1.
Figure 3:
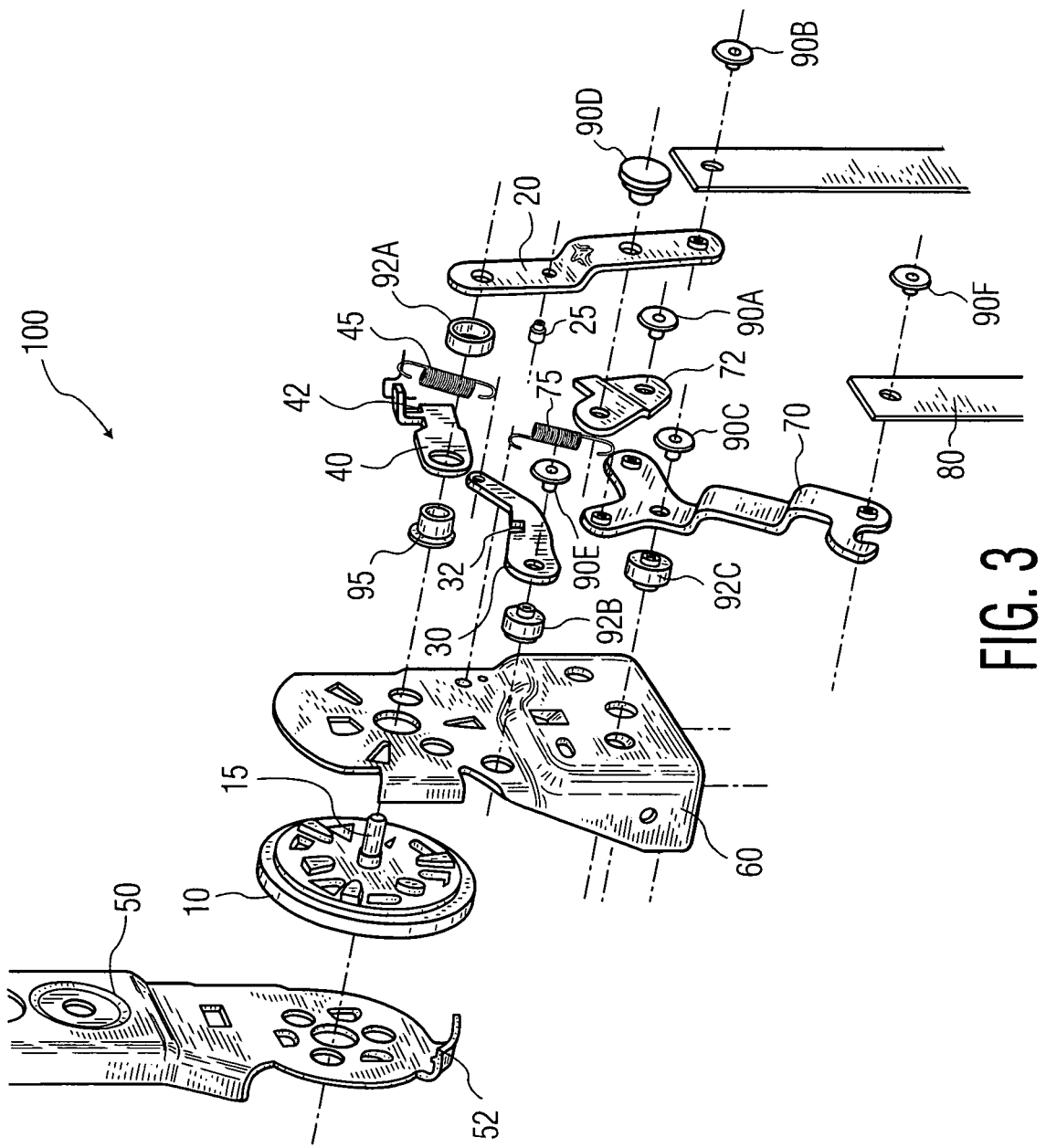
FIG. 3 is an exploded perspective view of the hold-open assembly of FIG. 1.

FIGS. 1-3 show an exemplary embodiment of an assembly 100 for holding open a locking mechanism for a motor vehicle folding seat. Assembly 100 comprises a locking mechanism 10 having a gear shaft 15, a release link 20 having a hold-open pin 25, a follower link 30 having a notch 32 to receive hold-open pin 25, an actuator 40 having a tab 42, an actuator spring 45, a seatback bracket 50 having a tab 52, a seat bottom bracket 60, a release handle 70 including a fixture 72, a handle spring 75, handle strap 80, fasteners 90A, B, C, D, E, and F, spacers 92A, B, and C, and a bushing 95.

Locking mechanism 10 is a recliner seat locking mechanism such as is known in the art. The locking mechanism contains gears activated by a spring that is coiled or uncoiled by the action of locking mechanism gear shaft 15 rotating in a clockwise or counterclockwise direction. As illustrated in FIG. 1, shaft 15 is rotated in a clockwise direction to coil the spring, thereby disengaging the gears and unlocking the mechanism. FIG. 1 shows assembly 100 in a locked configuration.

A top portion of release link 20 is fixedly attached to shaft 15. A bottom portion of release link 20 is rotatably attached to release handle 70 using a fastener 90D such as a pop rivet. Those skilled in the art will recognize that other fasteners may be used. Release handle 70 is also rotatably attached to seat bottom bracket 60. In the present embodiment, the release handle includes a fixture 72 to aid in attaching the handle to release link 20 and seat bottom bracket 60.

Referring now to FIG. 1, as the free end of release handle 70 is pulled to the right, the bottom portion of release link 20 moves to the left, rotating shaft 15 in a clockwise direction to unlock (release) locking mechanism 10. When seatback bracket 50 is in an upright or seating position, as shown in FIG. 1, handle spring 75 pulls the release handle back into the starting position shown in FIG. 1 when the handle is let go, returning release link 20 and locking mechanism gear shaft 15 to their starting positions in which locking mechanism 10 is locked (engaged).

Release link 20 includes a hold-open pin 25 that, when seatback bracket 50 is in an upright position, moves freely across an upper surface of follower link 30. Hold-open pin 25 is substantially perpendicular to the longitudinal axis of release link 20 and may be a separate element affixed to release link 20 or may be an integral part of the release link. As can be seen in FIG. 1, when seatback bracket 50 is in the upright position, follower link 30 is positioned such that hold-open pin 25 remains substantially above and outside of notch 32 in follower link 30 and is not engaged by the notch.

One end of follower link 30 is rotatably attached to seat bottom bracket 60 by, for example, a pop rivet 90E, while the other end is attached to actuator 40 by actuator spring 45. The end of actuator 40 to which spring 45 is attached has a tab 42, best seen in FIG. 2, that curves back toward seatback bracket 50 and is substantially perpendicular to the longitudinal axis of actuator 40. The other end of actuator 40 is rotatably attached to locking mechanism gear shaft 15 and is capable of rotating freely about the shaft.

Seatback bracket 50 is spring loaded such that when locking mechanism 10 is unlocked, the seatback bracket rotates into a folded or load floor orientation that is rotated approximately 90 degrees from the orientation shown in FIG. 1. As seatback bracket 50 rotates into the folded or load floor orientation, seatback bracket tab 52, shown in FIGS. 2 and 3, rotates upward to engage actuator tab 42, lifting the tab end of actuator 42 and tensioning spring 45. As spring 45 is tensioned, it pulls up on follower link 30, moving follower link notch 32 into position to engage hold-open pin 25. With hold-open pin 25 engaged by notch 32, release link 20 is held in the clockwise-rotated, unlocked position even after release handle 70 is let go.

As seatback bracket 50 is rotated back out of the folded position, seatback bracket tab 52 rotates away from and disengages from actuator tab 42. Actuator spring 45 returns actuator 40 to the starting position shown in FIG. 1, depressing follower link 30 and releasing hold-open pin 25 from follower link notch 32. This allows release link 20 to return to its starting position and re-engage locking mechanism 10.

As shown in FIG. 3, the present embodiment includes handle strap 80 attached to release handle 70 that aid in operating locking mechanism 10. Various additional fasteners 90A, B, C, D, and F, spacers 92A, B, and C, and a bushing 95 are also shown for connecting and reducing friction between the various elements of the assembly.

The present invention thus provides an assembly that holds open a locking mechanism for a motor vehicle folding seat, allowing an individual to use just one hand to return the seatback into an upright (seating) configuration from a folded (load-floor) configuration. While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An assembly for holding open a locking mechanism for a motor vehicle folding seat, the assembly comprising:
    a locking mechanism having a gear shaft;
    a release link fixedly attached to the gear shaft, the release link having a first position in which the gear shaft is rotated such that the locking mechanism is engaged and a second position in which the gear shaft is rotated such that the locking mechanism is released;
    a hold-open pin fixedly attached to the release link;
    a follower link having a notch sized to receive the hold-open pin; and
    an actuator operably attached to the follower link, the actuator having a first position in which the hold-open pin moves freely across an upper surface of the follower link and a second position in which the hold-open pin is received within the follower link notch;
    wherein when the actuator is moved into the second position with the hold-open pin received within the follower link notch, the release link is maintained in its second position with the locking mechanism released.

2. The assembly of claim 1 wherein the actuator includes a tab.

3. The assembly of claim 2 wherein the actuator tab is substantially perpendicular to the longitudinal axis of the actuator.

4. The assembly of claim 2 further comprising:
    a seatback bracket including a tab;
    wherein the seatback bracket tab engages the actuator tab to transition the actuator between its first position and its second position.

5. The assembly of claim 4 wherein the seatback bracket tab is substantially perpendicular to the longitudinal axis of the seatback bracket.

6. The assembly of claim 1 further comprising:
    a seat bottom bracket;
    wherein the follower link is rotatably attached to the seat bottom bracket.

7. The assembly of claim 1 further comprising:
    a release handle;
    wherein the release handle is rotatably attached to the release link.

8. The assembly of claim 7 further comprising:
    a handle spring:
    wherein a portion of the handle spring is attached to the release handle and a portion of the handle spring is attached to the seat bottom bracket.

9. The assembly of claim 7 further comprising:
    at least one handle strap, the handle strap attached to one of the release handle and the release link.

10. The assembly of claim 1 wherein the hold-open pin is substantially perpendicular to the longitudinal axis of the release link.

11. The assembly of claim 1 further comprising:
    an actuator spring;
    wherein the actuator is operably attached to the follower link by the actuator spring.

12. An assembly for holding open a locking mechanism for a motor vehicle folding seat, the assembly comprising:
    a locking mechanism comprising a gear shaft;
    a release link connected to the gear shaft, wherein the release link is configured to engage and release the locking mechanism;
    a hold-open pin connected to the release link;
    a follower link comprising notch configured to receive the hold-open pin; and
    an actuator connected to the follower link;
    wherein the actuator comprises a first position in which the hold-open pin is configured to move freely across an upper surface of the follower link and a second position in which the hold-open pin is received within the notch; and
    wherein when the actuator is moved into the second position, the release link releases the locking mechanism.

* * * * *